(12) United States Patent
Liu et al.

(10) Patent No.: US 9,197,407 B2
(45) Date of Patent: Nov. 24, 2015

(54) METHOD AND SYSTEM FOR PROVIDING SECRET-LESS APPLICATION FRAMEWORK

(75) Inventors: Dong-Yu Liu, Pingzhen (TW); Hong-Dian Chen, Taichung (TW)

(73) Assignee: CYBERLINK CORP., Shindian, Taipei (TW)

( * ) Notice: Subject to any disclaimer, the term of this patent is extended or adjusted under 35 U.S.C. 154(b) by 247 days.

(21) Appl. No.: 13/185,752

(22) Filed: Jul. 19, 2011

(65) Prior Publication Data

US 2013/0024689 A1    Jan. 24, 2013

(51) Int. Cl.
*H04L 9/08* (2006.01)

(52) U.S. Cl.
CPC ............ *H04L 9/0822* (2013.01); *H04L 9/0866* (2013.01); *H04L 9/0877* (2013.01); *H04L 2209/603* (2013.01)

(58) Field of Classification Search
None
See application file for complete search history.

(56) References Cited

U.S. PATENT DOCUMENTS

| | | | |
|---|---|---|---|
| 6,226,750 B1 * | 5/2001 | Trieger | 726/3 |
| 6,636,966 B1 | 10/2003 | Lee et al. | |
| 6,751,598 B1 * | 6/2004 | Yagawa et al. | 705/51 |
| 7,076,067 B2 | 7/2006 | Raike et al. | |
| 7,178,037 B2 | 2/2007 | Shimada et al. | |
| 2002/0138442 A1 | 9/2002 | Hori et al. | |
| 2004/0022391 A1 | 2/2004 | O'Brien | |
| 2004/0243815 A1 | 12/2004 | Tsukamura | |
| 2005/0144468 A1 * | 6/2005 | Northcutt et al. | 713/189 |
| 2005/0244003 A1 * | 11/2005 | Nagai et al. | 380/201 |
| 2007/0198424 A1 | 8/2007 | Yamamoto et al. | |
| 2007/0265973 A1 * | 11/2007 | Kahn | 705/57 |
| 2007/0297610 A1 | 12/2007 | Chen et al. | |
| 2008/0086646 A1 | 4/2008 | Pizano | |
| 2008/0130899 A1 | 6/2008 | Iwamoto et al. | |
| 2008/0253563 A1 | 10/2008 | Chang | |
| 2009/0007240 A1 | 1/2009 | Vantalon et al. | |
| 2009/0016537 A1 | 1/2009 | Ju et al. | |
| 2009/0025073 A1 * | 1/2009 | Beverly | 726/7 |
| 2009/0070584 A1 * | 3/2009 | Heen et al. | 713/168 |
| 2009/0132821 A1 | 5/2009 | Matsuzaki | |
| 2009/0202071 A1 | 8/2009 | Kato | |
| 2009/0210724 A1 * | 8/2009 | Hori | 713/193 |
| 2009/0268912 A1 | 10/2009 | Nakae | |
| 2010/0166189 A1 | 7/2010 | Morohoshi et al. | |
| 2010/0241855 A1 | 9/2010 | Chou et al. | |

(Continued)

FOREIGN PATENT DOCUMENTS

| | | | |
|---|---|---|---|
| JP | 2008047016 A | 2/2008 | |
| JP | 2009135721 A | 6/2009 | |

(Continued)

OTHER PUBLICATIONS

Enforcement for Usage Control—an Overview of Control Mechanisms Deliverables 1 and 2, DoCoMo Ero-Labs, Version 1.1, Oct. 2006.

*Primary Examiner* — David Le
(74) *Attorney, Agent, or Firm* — McClure, Qualey & Rodack, LLP (57) ABSTRACT

In one embodiment, providing, by a client device, device information and key data over a network to a server device, the device information uniquely identifying the client device; generating a device key, by a device key generation logic, at the server device based on the device information; receiving a module from the server device, the module comprising a bound content key and the device key generation logic, wherein the bound content key is encrypted by the device key at the server device; and processing protected content using the module.

20 Claims, 7 Drawing Sheets

(56) References Cited

U.S. PATENT DOCUMENTS

2010/0262833 A1 10/2010 Zollinger et al.
2010/0303236 A1* 12/2010 Laaksonen et al. ............ 380/270
2012/0159182 A1* 6/2012 Rouse ........................... 713/189

FOREIGN PATENT DOCUMENTS

| WO | 2004/008676 A2 | 1/2004 |
| WO | 2009/018513 A1 | 2/2009 |

* cited by examiner

METHOD AND SYSTEM FOR PROVIDING SECRET-LESS APPLICATION FRAMEWORK

TECHNICAL FIELD

The present disclosure is generally related to digital rights management, and, more particularly, is related to secure playback of multimedia content.

BACKGROUND

Over the years, digital video content has gained increasing popularity with consumers. With the vast amount of audio and video content available to consumers through broadcast, cable, on-demand, fixed media, and other available sources of multimedia content, consumers have access to a wide range of content and programming. Furthermore, an increasing amount of video content is becoming available over the Internet and other data services in the form of downloadable content.

Generally, video content can be stored in any number of common formats such as MPEG-1, MPEG-2, or DV (digital video), for example. Likewise, audio content may be stored in any number of common digital formats such as MP3, WAV, or MPEG Audio, for example. The availability of multimedia content in a vast array of digital formats has helped make distribution of multimedia content easier because of the high degree of portability. Unfortunately, piracy of audio/visual works has also proliferated over the years as technology continues to facilitate the distribution of multimedia content. Because of the ease in accessing and copying multimedia content over the Internet for example, video and audio piracy continues to be an ongoing problem.

In response to unauthorized copying and distribution of multimedia content, publishers and authors of audio/visual works have relied on technologies that control access to digital content. The phrase Digital Rights Management (DRM) generally refers to technologies used to achieve restricted access to multimedia content. Such DRM technologies are based on a large variety of technologies, including multimedia player software that controls access to content using encryption. However, some shortcomings to existing multimedia systems include the significant investment in designing a proper DRM system for the player software, the need for frequent player software updates, and the potential for leakage of master keys (e.g., reverse engineering through ready access to the host, etc.).

SUMMARY

In one embodiment, a method for processing a protected content, the method comprising: providing, by a client device, device information and key data over a network to a server device, the device information uniquely identifying the client device; generating a device key, by a device key generation logic, at the server device based on the device information; receiving a module from the server device, the module comprising a bound content key and the device key generation logic, wherein the bound content key is encrypted by the device key at the server device; and processing protected content using the module.

In another embodiment, a server device for protecting a licensed master key, comprising: an interface coupled to a network, the interface configured to receive device information and key data over the network from a client device, the device information uniquely identifying the client device; memory configured to store a licensed master key; a processing system coupled to the interface and the memory; first logic, wherein the processing system is configured by the first logic to generate a device key based on the device information; second logic, wherein the processing system is configured by the second logic to: calculate a content key based on the licensed master key and the key data; encrypt the content key based on the device key to produce a bound content key; provide a module that includes the first logic and the bound content key; and provide the module over the network to the client device for processing protected content using the module at the client device.

In another embodiment, a system for processing a protected content, the system comprising: a client device comprising: a memory configured to store device information, the device information uniquely identifying the client device; a first processing system; request logic, wherein the first processing system is configured by the request logic to: receive key data; and provide the device information and the key data over a network to a server device; and a playback application, wherein the first processing system is configured by the playback application to: receive a module from the server device, the module comprising a bound content key and a device key generation logic, the bound content key encrypted by a device key at the server device based on the device information, wherein the bound content key is generated based on a licensed master key stored in the server device and the key data; and process protected content using the module.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Disclosed herein are certain embodiments of secret-less application framework (SLAF) systems and methods (herein, collectively SLAF system or SLAF systems) that include a network-based architecture that stores master secret key(s) in a remote server device and delivers keys derived from the master as well as associated encryption/decryption mechanisms to a client device over a network. The delivery of such information enables playback by the client device of premium content (e.g., residing on and hence read from a computer-readable medium, such as an optical disc). By storing the master secret keys (herein, also referred to as master keys or licensed master keys) remotely, as opposed to embedding the master secret keys at the client device (e.g., in a player application), several advantages may be achieved over conventional systems, including a robustness to premium content systems (e.g., Advanced Access Content System—AACS, Blu-ray Managed Copy, etc.), a reduction in the cost and/or development of content protection methods, and/or a reduction in the need to upgrade player applications.

Digressing briefly, common premium content systems use several cryptographic secret keys to protect premium content. Such keys can be categorized into master keys and content keys. A master key refers to the root secret key used to derive subordinate content keys from a set of data files referred to herein as key data.

The phrase "managed copy" generally refers to authorized copies of multimedia content. These authorized copies may be protected by AACS, which is a standard relating to content distribution and Digital Rights Management (DRM). For instance, a client device (e.g., playback apparatus) may be configured to obtain authorization for creating or downloading a managed copy by contacting a designated server device on the Internet, for example. To protect against unauthorized distribution of media content, managed copies are protected by DRM such that uncontrolled copying is prevented.

A client device may utilize managed copies for different purposes such as creating an exact duplicate of a movie title (e.g., the multimedia content) onto a computer readable medium (e.g., recordable disc, DVD, etc.) as a backup, creating a full-resolution copy for storage on a media server, and creating a scaled-down version of a movie title for playback on a portable device. A media file may be encoded in any of a variety of audio/video formats including, but not limited to: VOB (video object) files, MOV files, AVI files, WMV files, and MPEG files.

The content on a local computer readable medium may generally be categorized into two categories—the main multimedia content itself and volume information relating to the disc. For example, under the AACS standard, this volume information is referred to as the Media Key Block (MKB).

In certain embodiments of SLAF systems, the master key is built-in to an SLAF server device (e.g., stored in memory, such as secure memory or registers), and content keys are calculated (based on key data encoded on a computer readable medium and extracted and communicated by a client device) in the SLAF server device and stored within one or more SLAF modules in an encrypted and obfuscated form. The encryption is based at least in part on device information communicated to the server device by a client device. The device information uniquely identifies a given client device. These modules (herein, also SLAF modules, which includes copies thereof) are communicated over a network (e.g., the Internet) to the client device associated with the device information. The SLAF modules are used to transcrypt and decrypt the protected content for playback by the client device.

Figure 1:
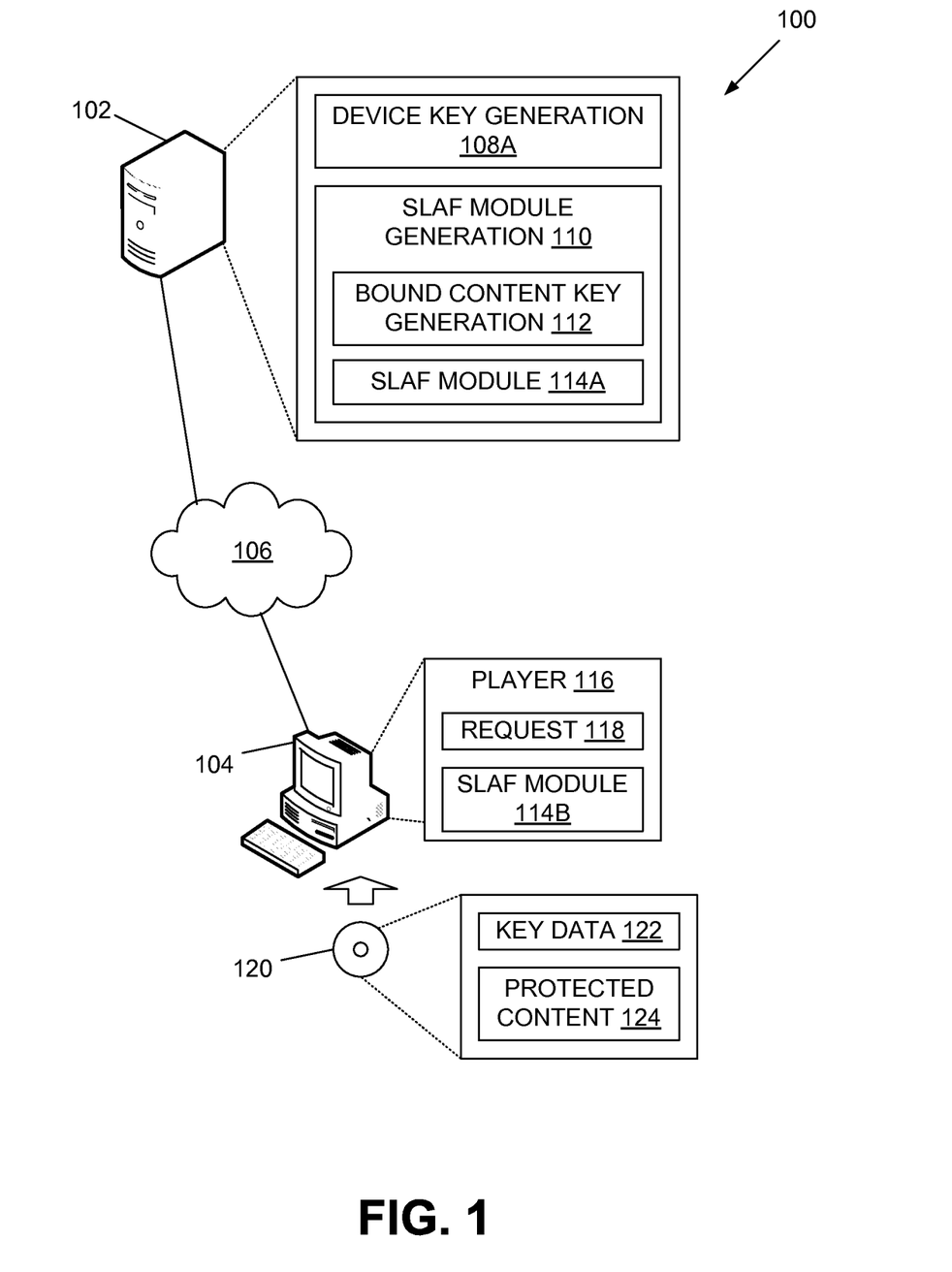
FIG. 1 is a block diagram of an example network environment in which an embodiment of a secret-less application framework (SLAF) system may be implemented.

Having provided a brief overview of certain embodiments of SLAF systems, attention is directed to FIG. 1, which provides an example environment in which one or more embodiments of SLAF systems may be implemented. In particular, FIG. 1 illustrates an example communication network 100 comprising a server device 102 in communication with a client device 104 via a network 106. Although shown using a single apparatus on respective client and server sides of the network 106 for brevity, it should be understood by one having ordinary skill in the art that the arrangement depicted in FIG. 1 is for illustrative purposes, and that additional client and/or server devices are contemplated to be within the scope of the disclosure. In addition, intermediate devices, such as gateways, routers, etc. may be interposed between the client device 104, the network 106, and/or server device 102. In some embodiments, it should be appreciated that one or more additional devices may be located upstream and/or downstream of the server device 102 and client device 104, respectively.

The server device 102 includes one or more modules of executable code (e.g., software, also referred to as logic), including device key generation logic 108A and SLAF module generation logic 110. The device key generation logic 108A and SLAF module generation logic 110 collectively comprise an SLAF server. The device key generation logic 108A derives a device key based on device information received from the client device 104. The SLAF module generation logic 110 includes bound content key generation logic 112 and one or more SLAF modules, such as SLAF module 114A. The bound content key generation logic 112 calculates each content key based on a locally-stored (e.g., local to the server device 102) licensed master key and, then encrypts the content key using the device keys to provide a bound content key(s). In some embodiments, the licensed master key may be stored in a storage device proximally located, and coupled, to the server device 102.

The network 106 comprises a bi-directional communication medium, which may include a wide area network (WAN, such as the Internet), local area network (LAN), or a combination of both. In addition, the network 106 may comprise of a wired medium, wireless medium, or a combination of both.

The client device 104 includes one or more modules of executable code (e.g., software, herein also logic), including a player application 116 (also referred to herein as an SLAF client) that includes request logic 118 and SLAF module 114B. In one embodiment, the SLAF modules 114B and 114A, and their associated constituent components, are the same (e.g., copies), where use of "A" and "B" as a suffix to "114" is used herein to distinguish their location (e.g., client-side versus server-side) for purposes of brevity. In general, the player application 116 comprises media reading logic that reads and processes volume information and multimedia content from a computer readable medium 120 (e.g. flash memory or optical disc). For instance, the player application 116 may read and process key data (e.g., Media key block, MKB) 122 encoded in the computer readable medium 120 to enable decryption of protected content (e.g., multimedia content or one or more constituent elements thereof, such as audio, video, graphics, data, etc.) 124, also residing on the computer readable medium 120, for eventual playback (e.g., video, graphical, and/or audio playback) of the unprotected version of the multimedia content.

The SLAF module 114B is downloaded from the SLAF server device 102, for instance subsequent to an authentication between the SLAF server and SLAF client. The SLAF module 114B includes the bound content key (e.g., copy) configured at the server device 102 and a copy of the device key generation logic 108A used at the server device 102 to generate the device keys. The bound content key is used by the SLAF module 114B to transcrypt the protected content, which is then decrypted by the SLAF module 114B to provide the resulting unprotected content for playback.

The request logic 118 provides device information, unique to the client device 104, to the server device 102 (e.g., to the device key generation logic 108A), and also receives (e.g., reads, such as via media read functionality) the key data 122 from the computer readable medium 120. Such device information may include information corresponding to a current operating environment of the client device 104, such as CPU identification, hard drive identification, network adaptor MAC address, optical disc (such as DVD, Blu-ray) identification, optical drive identification, graphics card identification, sound card identification, motherboard identification, etc or a combination thereof.

The client device 104 may comprise any one of a plurality of devices, including a dedicated player appliance, set-top box, laptop, computer workstation, cellular phone, personal digital assistant (PDA), handheld or pen based computer, embedded appliance, or other communication (wired or wireless) device that is coupled to, or integrated with, a disc drive (e.g., optical disc drive) for enabling playback of multimedia content from the computer readable medium 120.

The computer readable medium 120 may include any one of a plurality of types of media, including Digital Video Disc (DVD), video CD (VCD), High Definition DVD (HD-DVD), and BLU-RAY Disc. In some embodiments, the computer readable medium 120 may be configured with multimedia content from managed copies of an HD-DVD or a BLU-RAY Disc.

Figure 2:
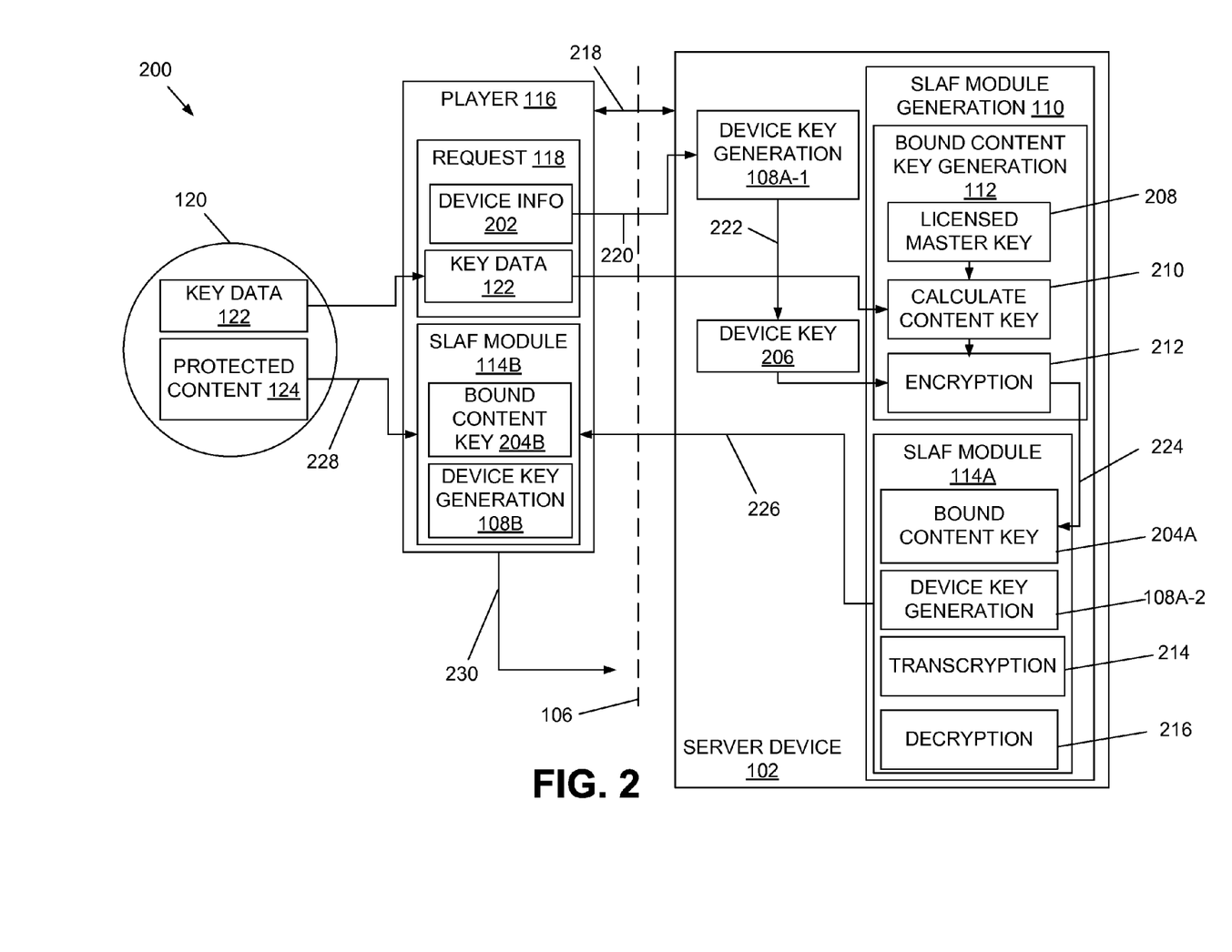
FIG. 2 is a block diagram that illustrates several components of an embodiment of an SLAF system and an example general process flow between these components.

Referring now to FIG. 2, shown is an example process flow in an example embodiment of an SLAF system 200, in which select components from the communication network 100 described in association with FIG. 1 are depicted. In particular, the computer readable medium 120 is shown with key data 122 and protected content 124 encoded thereon. The player application 116 is depicted with request logic 118 and the downloaded SLAF module 114B. The request logic 118 stores device information 202 (which may be read from local storage, such as registers or memory of the client device 104), and key data 122 that may be accessed from the computer readable medium 120. The SLAF module 114B comprises, among other components (e.g., decryption and transcryption logic, as disclosed below), the device key generation logic 108B and a bound content key 204B downloaded from the server device 102, as explained further below.

The player application 116 is in communication with the server device 102 via the network 106 (represented in FIG. 2 with the single, vertically-dashed line). The server device 102 includes the device key generation logic 108A-1 and the SLAF module generation logic 110. As the name implies, the device key generation logic 108A-1 generates a device key 206, as explained further below. The SLAF module generation logic 110 includes the bound content key generation logic 112 and the SLAF module 114A. The bound content key generation logic 112 includes a licensed master key 208 (which may be accessed from local storage (e.g., registers or secured memory) within, or proximal to, the server device 102), calculate content key logic 210, and encryption logic 212. The constituent components of the bound content key generation logic 112 comprise calculation and encryption functionality well-known to those having ordinary skill in the art. The SLAF module 114A includes the bound content key 204A provided (e.g., generated) by the bound content key generation logic 112, and further includes the device key generation logic 108A-2 corresponding to (e.g., a copy of) the device key generation logic 108A-1, transcryption logic 214, and a decryption logic 216.

In one embodiment, the transcryption logic 214 and the decryption logic 216 are created each time the content keys are created, and hence the logic 214 and 216 are specific to a given content key and the device information 202. The server device 102 generates one or more bound content keys 204A and a device key generation logic 108A-2. A SLAF module 114A, comprising the bound content key 204A, the device key generation logic 108A-2, the transcryption logic 214 and the decryption logic 216, is sent to a client device 104. The device key generation logic 108A-2, when downloaded and implemented at the client device 104 (shown at the client device 104 as device key generation logic 108B), generates a device key using the bound content key 204B at the client device 104. The transcryption logic 214, when implemented at the client device 104, transcrypts the protected content using the bound content key 204B from a first encryption format (e.g. AACS encrypted content) to a second encryption format (e.g. managed copy output format). The decryption logic 216, when implemented at the client device 104, is configured to decrypt the protected content having the second encrypted format (e.g. managed copy output format) to unprotected content (e.g., H.264 format) based on the device key generated at the client device 104. The client device 104 finally can play back the unprotected content.

In one example operation (with steps in the processes described hereinafter indicated in parenthesis), the player application 116 sends a request to the server device 102 to start a client-server authentication (218). If the authentication fails, the server device 102 aborts the process. If the authentication succeeds and the server device 102 determines the player application 116 is out-of-date, the server device 102 requests that the player application 116 commence an upgrade. The player application 116 sends a request that includes the device information 202 embedded in the client device 104 and the key data 122 accessed from the computer readable medium 120 (220).

At the server device 102, the device key generation logic 108A-1 derives the device key 206 based on the device information 202 received from the request logic 118 (222). The bound content key generation logic 112 provides (e.g., generates) the bound content key 204A (224). For instance, the calculate content key logic 210 calculates the content keys from the built-in licensed master key 208, and the content keys are encrypted by the encryption logic 212 based on the device key 206 that is derived from the key data 122. The encrypted content keys provided by the bound content key generation logic 112 are referred to herein also as bound content keys 204A (and 204B at the client device 104). It is noted that with the licensed master key (e.g., the AACS device key) 208 residing in (or in some embodiments, proximal to) the server device 102, the various aforementioned shortcomings (among others) of player application-residing master keys is avoided.

The SLAF module generation logic 110 creates the SLAF module 114A with the bound content key 204A and the device key generation logic 108A-2 (e.g., a copy of device key generation logic 108A-1) incorporated therein. Additionally, the SLAF module generation logic 110 creates at least two additional logic modules, including the transcryption logic 214 and decryption logic 216, the functionality of which is explained further below.

The SLAF module generation logic 110 provides (e.g., downloads) the SLAF module 114A to the client device 104 (e.g., to the player application 116) (226), where when residing in the player application 116, the downloaded SLAF module is referred to as SLAF module 114B as explained above. The player application 116 accesses the protected content 124 from the computer readable medium 120 (228), and executes the SLAF module 114B to provide unprotected content that is ultimately further processed (e.g., decoded) and output (230) for presentation. It should be understood by one having ordinary skill in the art, in the context of the present disclosure, that in some embodiments, one or more of the above-referenced steps may be implemented in a different order, or two or more of the steps may be implemented concurrently.

Having described a general process flow of an embodiment of the SLAF system 200 in FIG. 2, attention is directed to an illustration of an example SLAF module processing for specific, example encryption formats, namely AACS and MCOF (Managed Copy Output Format). It should be understood that other encryption formats (e.g., Digital Entertainment Content Ecosystem (DECE), Common File Format (CFF), etc.) may likewise be used in some embodiments, and hence are contemplated to be within the scope of the disclosure. In general, the media key block (MKB) is read by the player software 116 of the client device 104, and communicated to the server device 102 to generate content keys based on the master key stored at the server device 102. The AACS scheme encrypts content under one or more title keys using the Advanced Encryption Standard (AES). These title keys are derived and encrypted from a combination of a media key and other pieces of information, including the volume ID associated with the disc and device information associated with the client device 104.

Figure 3:
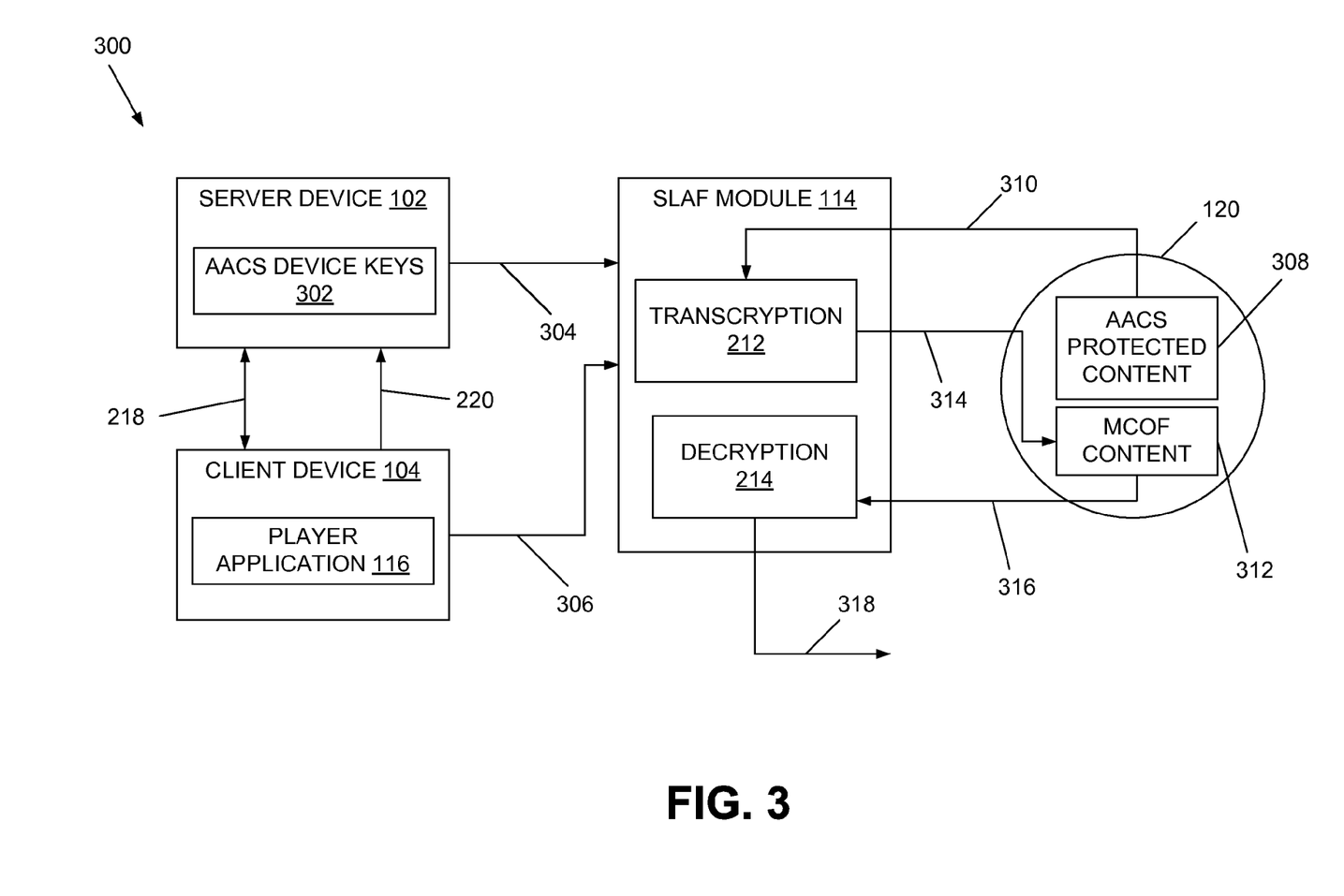
FIG. 3 is a block diagram that further illustrates an example process flow between select components of an embodiment of an SLAF system using an Advanced Access Content System (AACS)-based encryption format.

Shown in FIG. 3 is an embodiment of a SLAF system 300 with a subset of select components from the SLAF system 200 depicted to simplify the illustration of the process flow, with the understanding that components present in FIG. 2 yet omitted in FIG. 3 are nevertheless assumed to be incorporated at least in part, if not wholly, in the present SLAF system embodiment 300. Similar to the description corresponding to FIG. 2, the client device 104 and the server device 102 engage in an authentication (218), and the player application 116 sends a request that includes device information (220) used by the server device 102 with an AACS Device key (302), which is the Licensed Master key 208 in FIG. 2.

The server device 102 generates the SLAF module 114 (304), which is communicated to the client device 104, wherein the SLAF module is executed (306). During execution, AACS protected content 308 is accessed from the computer readable medium 120 (310) and transcrypted by the transcryption logic 212 to produce MCOF content 312 (314). The MCOF content 312 is then accessed (316) and decrypted by the decryption logic 214. The decrypted content is decoded by decoding logic (not shown) of the client device 104 and output as unprotected content (318) for presentation (e.g., playback).

Figure 4:
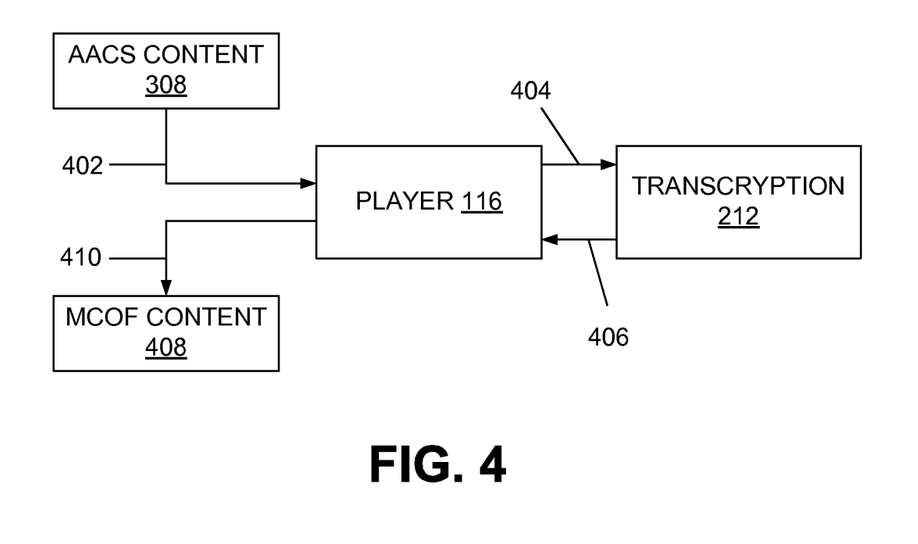
FIGS. 4-5 are block diagrams that illustrate example process flows among select components of an embodiment of an SLAF module implemented at a client device using an AACS-based encryption format.
Figure 5:
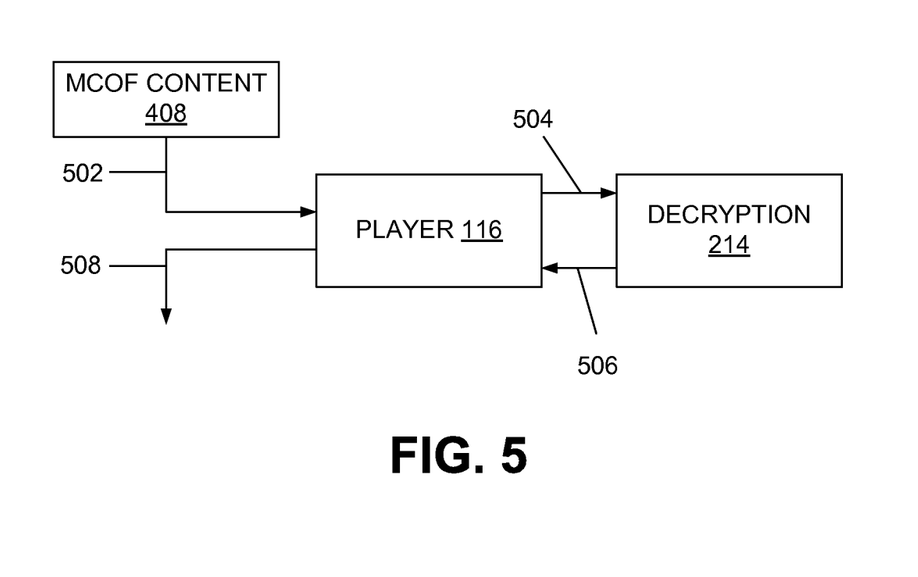

FIGS. 4-5 further illustrate example processing performed by embodiments of the transcryption logic 212 and the decryption logic 214, respectively, as implemented at the client device 104. Referring to FIG. 4, the player application 116 receives the AACS protected (encrypted) content 308 (402), and the AACS content 308 is provided to the transcryption logic 212 (404) for execution. The transcryption logic 212 transcrypts (e.g., converts, such as via a Bound Copy Encryption Method or BCEM) the AACS content 308 to MCOF content 408 (406), which the player application 116 stores (410). BCEM protected content is bound to specific device (e.g., client device 104) information, such that copying the content to other platforms results in a decryption failure. In other words, the protected content may only be output in a specific environment or platform. The player application 116 stores the MCOF content 408 in persistence storage (e.g., hard drive) or other storage device. Note that the MCOF content 408 comprises a format structure used to store the content that is copied from AACS protected content to a hard disk. Audio/visual content in an MCOF structure is protected by BCEM.

Referring to FIG. 5, the player application 116 accesses the MCOF content 408 (502), uses the decryption logic 214 to convert the MCOF content (504) to the decrypted content (506) for the player application 116, which processes (e.g., decodes) the decrypted content and provides the resulting unprotected content as an output for presentation (508).

Figure 6:
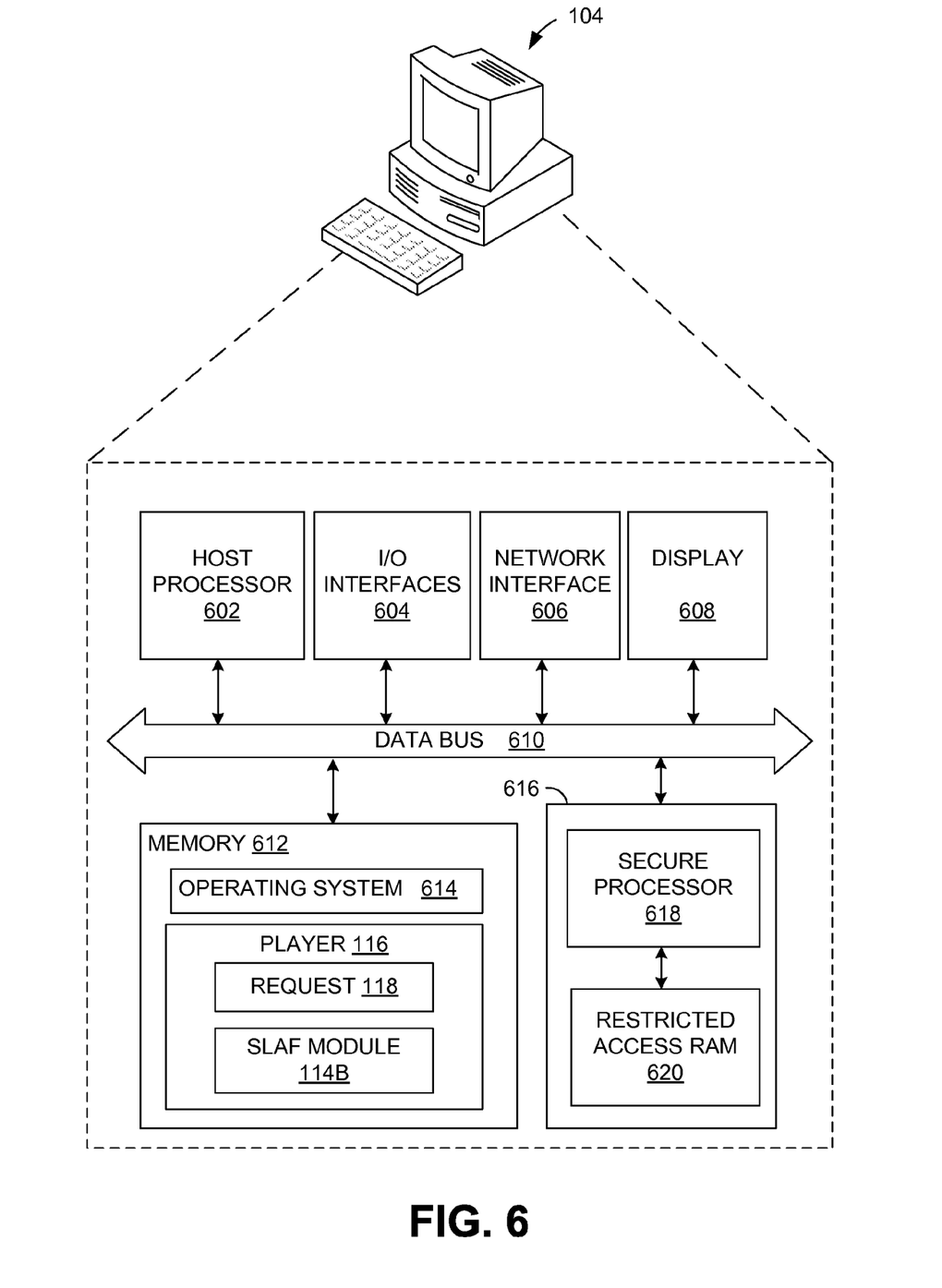
FIG. 6 is a block diagram of an example embodiment of a client device employed in an embodiment of a SLAF system.

Reference is now made to FIG. 6, which illustrates an embodiment of the client device 104. The client device 104 may, for instance, comprise a host processor 602, one or more input/output interfaces 604, a network interface 606, and a display 608 connected across a data bus 610. The client device 104 may further comprise a memory 612 that includes an operating system 614 and application specific software, such as the player application 116. As explained above, the player application 116 comprises the request logic 118 and the downloaded SLAF module 114B. In some embodiments, the client device 104 may further comprise secure logic 616, such as a secure processor 618 coupled to restricted access memory (e.g., RAM) 620. The secure logic 616 may be embodied as a tamper proof package (e.g., ASIC, etc.) and/or have restricted access. The secure logic 616 may be utilized to provide a further level of content protection/secure access by executing one or more encryption/decryption schemes associated with at least a portion of the processing of the player application 116. In other words, processing of the player application 116 may be performed by the host processor 202, the secure processor 618, or a combination of both. Herein, reference to processing system refers to the host processor 602, secure processor 618, or a combination of both. The memory 612 and secure logic 616 are connected to the data bus 610.

The host processor 602 and secure processor 618 may include any custom made or commercially available processor, a central processing unit (CPU) or an auxiliary processor among several processors associated with the client device 104, a semiconductor based microprocessor (in the form of a microchip), one or more ASICs, a plurality of suitably configured digital logic gates, and other well-known electrical configurations comprising discrete elements both individually and in various combinations to coordinate the overall operation of the computing system.

The memory 612 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 612 typically comprises the native operating system 614, one or more native applications, emulation systems, or emulated applications for any of a variety of operating systems and/or emulated hardware platforms, emulated operating systems, etc. For example, the applications may include application specific software stored on a computer readable medium for execution by the processing system (e.g., host processor 602 and/or secure processor 618) and may include the player application 116 and its corresponding constituent components. One of ordinary skill in the art will appreciate that the memory 612 may, and typically will, comprise other components which have been omitted for purposes of brevity.

Input/output interfaces 604 provide any number of interfaces for the input and output of data. For example, where the client device 104 comprises a personal computer, these components may interface with a user input device, which may be a keyboard or a mouse. Where the client device 104 comprises a handheld device (e.g., PDA, mobile telephone), these components may interface with function keys or buttons, a touch sensitive screen, a stylist, etc. The input/output interfaces 604 may further include one or more disc drives (e.g., optical disc drives, magnetic disc drives) to enable playback of multimedia content residing on a computer readable medium 120. The display 608 may comprise a computer monitor or a plasma screen for a PC or a liquid crystal display (LCD) on a hand held device, for example. In some embodiments, the display 608 may be separate from the client device 104.

In the context of this disclosure, a "computer-readable medium" stores one or more programs and data for use by or in connection with the instruction execution system, apparatus, or device. The computer readable medium may be a non-transitory medium, for example, but not limited to, an electronic, magnetic, optical, electromagnetic, infrared, or semiconductor system, apparatus, or device. More specific examples (a non-exhaustive list) of the computer-readable medium may include, in addition to those set forth above, the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), and a portable compact disc read-only memory (CDROM) (optical).

With further reference to FIG. 6, the network interface device 606 comprises various components used to transmit and/or receive data over a network environment. By way of example, the network interface 606 may include a device that can communicate with both inputs and outputs, for instance, a modulator/demodulator (e.g., a modem), wireless (e.g., radio frequency (RF)) transceiver, a telephonic interface, a bridge, a router, network card, etc. The client device 104 may further comprise mass storage (not shown). For some embodiments, the mass storage may include a data structure (e.g., database) to store and manage data. Such data may comprise, for example, editing files which specify special effects for a particular movie title.

Figure 7:
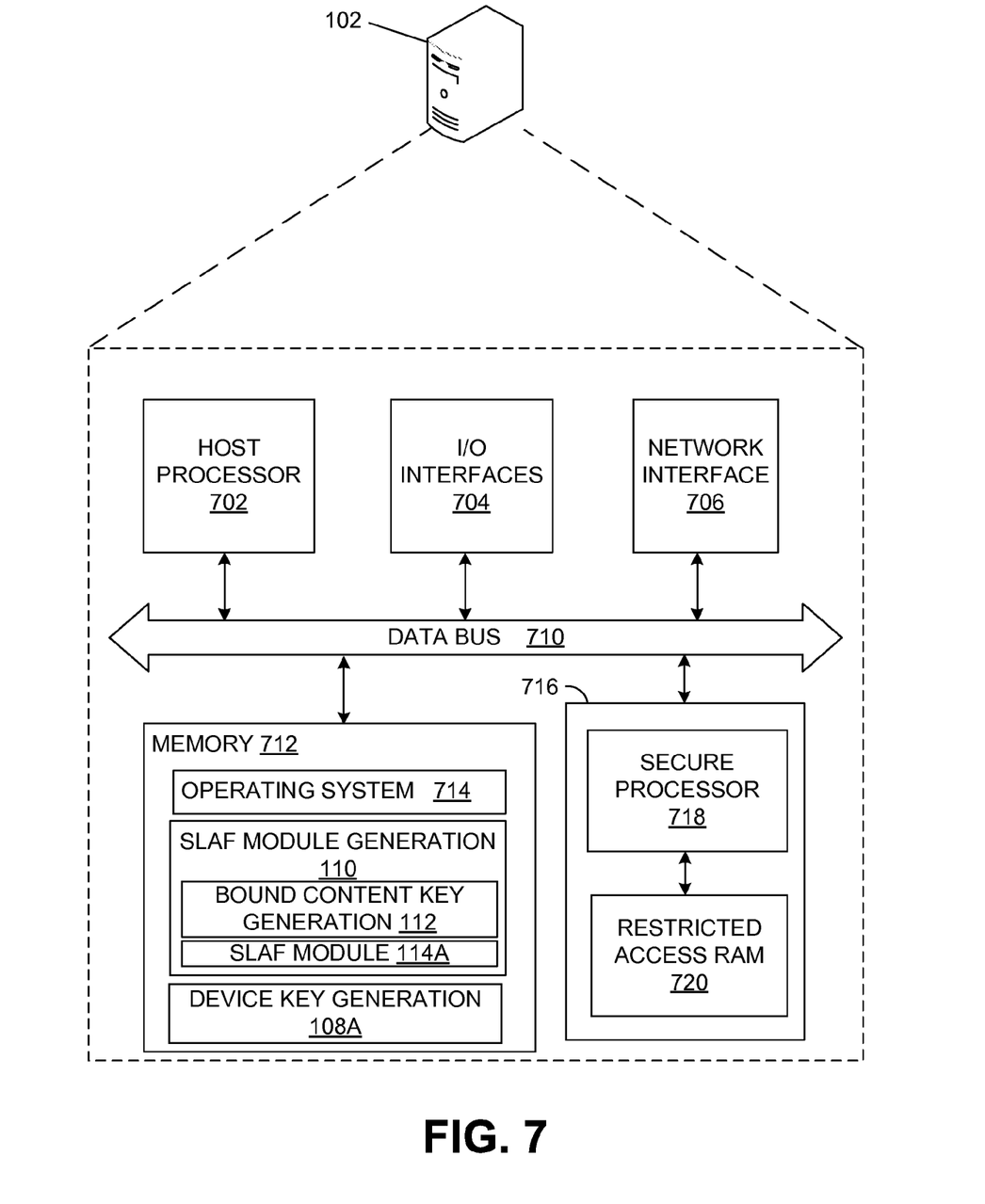
FIG. 7 is a block diagram of an example embodiment of a server device employed in an embodiment of a SLAF system.

FIG. 7 illustrates an embodiment of an example server device 102. As shown in FIG. 7, similar components to those shown in the client device 104 of FIG. 6 may be used, including a host processor 702, one or more I/O interfaces 704, and a network interface 706 connected across a data bus 710. The server device 102 may further comprise a memory 712 that includes an operating system 714 and application specific software, such as the SLAF module generation logic 110 and the device key generation logic 108A. As depicted in FIG. 7, and explained previously, an embodiment of the SLAF module generation logic 110 comprises the bound content key generation logic 112 and the SLAF module 114A. In some embodiments, the server device 102 may further comprise secure logic 716, such as a secure processor 718 coupled to restricted access memory (e.g., RAM) 720. The secure logic 716 may be embodied as a tamper proof package (e.g., ASIC, etc.) and/or have restricted access. The secure logic 716 may be utilized to provide a further level of content protection/secure access by executing one or more encryption/decryption schemes associated with at least a portion of the processing of the SLAF module generation logic 110 and/or the device key generation logic 108A. In other words, processing of the SLAF module generation logic 110 and/or the device key generation logic 108A may be performed by the host processor 702, the secure processor 718, or a combination of both. Herein, reference to processing system also may refer to the host processor 702, secure processor 718, or a combination of both, and its use in the claims is understood depending on the context. The memory 712 and secure logic 716 are connected to the data bus 710.

The host processor 702 and secure processor 718 may include any custom made or commercially available processor, a central processing unit (CPU) or an auxiliary processor among several processors associated with the server device 102, a semiconductor based microprocessor (in the form of a microchip), one or more ASICs, a plurality of suitably configured digital logic gates, and other well-known electrical configurations comprising discrete elements both individually and in various combinations to coordinate the overall operation of the computing system.

The memory 712 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 712 typically comprises the native operating system 714, one or more native applications, emulation systems, or emulated applications for any of a variety of operating systems and/or emulated hardware platforms, emulated operating systems, etc. For example, the applications may include application specific software stored on a computer readable medium for execution by the processing system (e.g., host processor 702 and/or secure processor 718) and may include the SLAF module generation logic 110 and/or the device key generation logic 108A. One of ordinary skill in the art will appreciate that the memory 712 may, and typically will, comprise other components which have been omitted for purposes of brevity.

Input/output interfaces 704 provide any number of interfaces for the input and output of data. In some embodiments, a display (not shown) may be coupled to the server device 102, such as to facilitate administrator input (e.g., such as via displayed graphical user interface or GUI).

The network interface device 706 comprises various components used to transmit and/or receive data over a network environment. By way of example, the network interface 706 may include a device that can communicate with both inputs and outputs, for instance, a modulator/demodulator (e.g., a modem), wireless (e.g., radio frequency (RF)) transceiver, a telephonic interface, a bridge, a router, network card, etc. The server device 102 may further comprise mass storage (not shown) integrated with, or externally coupled to, the server device 102.

Figure 8:
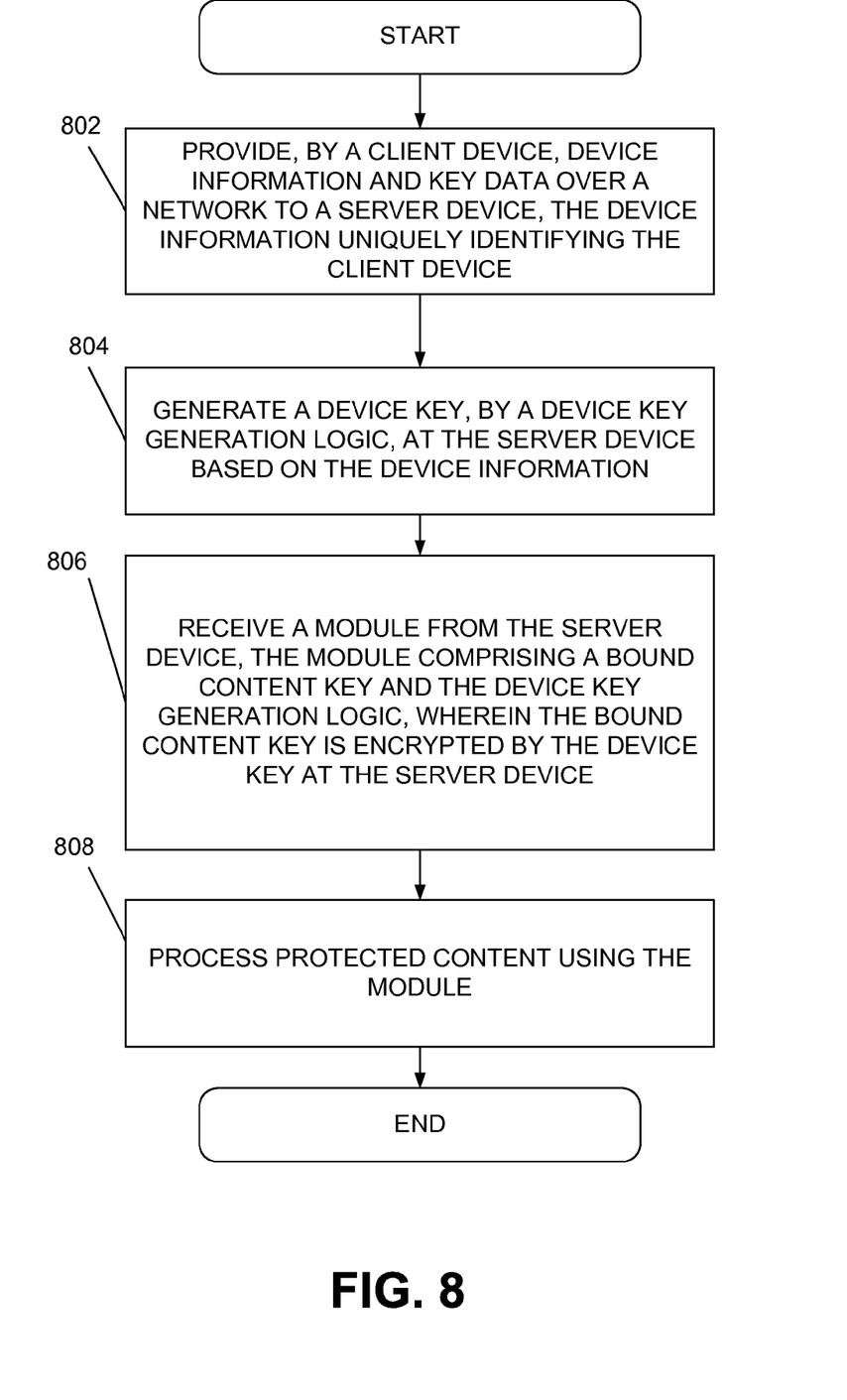
FIG. 8 is a flow diagram of an embodiment of a SLAF method implemented at a client device and a server device.

Having provided a detailed description of certain embodiments of SLAF systems, it should be appreciated that one method embodiment 800 for processing protected content, implemented by the client device 104 and the server device 102 and depicted in FIG. 8, comprises providing, by a client device, device information and key data over a network to a server device, the device information uniquely identifying the client device (802); generating a device key, by a device key generation logic, at the server device based on the device information (804); receiving a module from the server device, the module comprising a bound content key and the device key generation logic, wherein the bound content key is encrypted by the device key at the server device (806); and processing protected content using the module (808). For instance, the bound content key is based on a licensed master key stored in the server device and the key data. Such processing may include transcrypting, decrypting, and decoding the protected content to provide unprotected content for output and presentation (e.g., display, audio presentation, etc.).

Any process descriptions or blocks in flow diagrams should be understood as representing modules, segments, or portions of code which include one or more executable instructions for implementing specific logical functions or steps in the process, and alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present invention. Also, though certain architectures are illustrated in the present disclosure, it should be appreciated that the methods described herein are not necessarily limited to the disclosed architectures.

In addition, though various delineations in software logic have been depicted in the accompanying figures and described in the present disclosure, it should be appreciated that one or more of the functions performed by the various logic described herein may be combined into fewer software modules and or distributed among a greater number. Further, though certain disclosed benefits/advantages inure to certain embodiments of SLAF systems, it should be understood that not every embodiment necessarily provides every benefit/advantage.

In addition, the scope of the certain embodiments of the present disclosure includes embodying the functionality of certain embodiments of SLAF systems in logic embodied in hardware or software-configured mediums. For instance, in some embodiments, one or more of the software functionality described herein for certain embodiments of the SLAF systems may be implemented at least in part in hardware.

It should be emphasized that the above-described embodiments of the present disclosure are merely possible examples of implementations, merely set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. A method for processing a protected content comprising a managed copy of encrypted multimedia content stored on a computer readable medium, the method comprising:
   providing, by a client device, device information and key data over a network to a server device, the device information uniquely identifying the client device, wherein the key data is encoded on the computer readable medium and obtained by the client device from the computer readable medium, and wherein the key data comprises volume information relating to the computer readable medium;
   generating a device key, by a device key generation logic, at the server device based on the device information;
   generating a bound content key based on the key data;
   receiving a module from the server device, the module comprising the bound content key and the device key generation logic, wherein the bound content key is encrypted by the device key at the server device; and
   processing, by the client device, the protected content by executing the device key generation logic in the module, wherein processing further comprises transcrypting the protected content using the bound content key from a first encryption format to a second encryption format comprising a managed copy output format (MCOF).

2. The method of claim 1, wherein generating the bound content key based on the key data comprises:
   producing a content key based on a licensed master key stored in the server device and the key data, wherein the licensed master key remains in the server device so that the licensed master key is protected by the server device, and
   encrypting the content key by the device key at the server device to generate the bound content key.

3. The method of claim 1, wherein processing further comprises decrypting the MCOF content using the bound content key and reproducing the unprotected content.

4. The method of claim 1, wherein processing further comprises receiving at the client device the protected content from a non-transitory medium.

5. The method of claim 1, further comprising providing, by the client device, a request to the server device to start an authentication between the client device and the server device prior to providing the device information and the key data.

6. The method of claim 1 wherein the network comprises one of a wide area network, a local area network, or a combination of a wide area network and a local area network.

7. The method of claim 1, wherein the network comprises a wireless network.

8. The method of claim 1, wherein the device information is based on an operating environment of the client device.

9. The method of claim 8, wherein the device information comprises one or a combination of CPU identification, hard drive identification, network adaptor MAC address, optical disc identification, optical drive identification, graphics card identification, sound card identification, or motherboard identification.

10. A server device for protecting a licensed master key, the server device comprising:
    an interface coupled to a network, the interface configured to receive device information and key data over the network from a client device, the device information uniquely identifying the client device, the key data being encoded on a computer readable medium and obtained by the client device from the computer readable medium, and wherein the key data comprises volume information relating to the computer readable medium;
    memory configured to store the licensed master key;
    a processing system coupled to the interface and the memory;
    first logic, wherein the processing system is configured by the first logic to generate a device key based on the device information;
    second logic, wherein the processing system is configured by the second logic to:
      calculate a content key based on the licensed master key and the key data;
      encrypt the content key based on the device key to produce a bound content key;
      provide a module that includes the first logic and the bound content key; and
      provide the module over the network to the client device for processing protected content comprising a managed copy of encrypted multimedia content stored on the computer readable medium by executing the first logic in the module at the client device, wherein processing further comprises transcrypting the protected content using the bound content key from a first encryption format to a second encryption format comprising a managed copy output format (MCOF).

11. The server device of claim 10, wherein the processing system is further configured by the second logic to include in the module decryption logic, and at the client device, the decryption logic is configured to decrypt the MCOF content to unprotected content based on the device key at the client device.

12. The server device of claim 10, wherein the network comprises one of a wide area network, a local area network, or a combination of a wide area network and a local area network.

13. The server device of claim 10, wherein the network comprises a wireless network.

14. The server device of claim 10, wherein the device information is based on an operating environment of the client device.

15. A system for processing a protected content comprising a managed copy of encrypted multimedia content stored on a computer readable medium, the system comprising:
- a client device comprising:
  - a memory configured to store device information, the device information uniquely identifying the client device;
  - a first processing system;
  - request logic, wherein the first processing system is configured by the request logic to:
    - receive key data encoded on the computer readable medium, wherein the key data comprises volume information relating to the computer readable medium; and
    - provide the device information and the key data over a network to a server device; and
  - a playback application, wherein the first processing system is configured by the playback application to:
    - receive a module from the server device, the module comprising a bound content key and a device key generation logic, the bound content key encrypted by a device key at the server device based on the device information, wherein the bound content key is generated based on a licensed master key stored in the server device and the key data; and
    - process protected content by executing the device key generation logic in the module, wherein processing further comprises transcrypting the protected content using the bound content key from a first encryption format to a second encryption format comprising a managed copy output format (MCOF).

16. The system of claim 15, wherein the module comprises decryption logic, the first processing system configured by the decryption logic to decrypt the MCOF content to unprotected content, the decryption based on the device key.

17. The system of claim 15, wherein the client device further comprises an interface, wherein the first processing system is further configured by the playback application to receive the protected content from a non-transitory medium.

18. The system of claim 17, wherein the non-transitory medium comprises one of flash memory, non-volatile memory, or an optical disc.

19. The system of claim 15, further comprising a display device, wherein the first processing system is further configured by the playback application to provide unprotected content corresponding to the processed protected content for playback on the display device.

20. The system of claim 15, further comprising the server device coupled to the client device by the network, wherein the server device comprises:
- an interface coupled to the network, the interface configured to receive the device information and the key data from the client device;
- memory configured to store the licensed master key;
- a second processing system coupled to the interface and the memory;
- the first logic, wherein the second processing system is configured by the first logic to generate the device key; and
- second logic, wherein the second processing system is configured by the second logic to:
  - calculate a content key based on the licensed master key and the key data;
  - encrypt the content key based on the device key to produce the bound content key;
  - provide the module that includes the first logic, the bound content key, the transcryption logic, and the decryption logic; and
  - provide the module over the network to the first device for processing protected content using the module at the client device.

* * * * *